(12) United States Patent
Lee et al.

(10) Patent No.: US 7,538,915 B2
(45) Date of Patent: May 26, 2009

(54) BOOK SCANNER WITH A MINIMIZED SCAN MARGIN

(75) Inventors: Tzu-Hsiung Lee, Taipei (TW); Thomas Sheng, Hsinchu (TW)

(73) Assignee: Avision Inc. (TW)

( * ) Notice: Subject to any disclaimer, the term of this patent is extended or adjusted under 35 U.S.C. 154(b) by 891 days.

(21) Appl. No.: 11/113,076

(22) Filed: Apr. 25, 2005

(65) Prior Publication Data

US 2005/0237584 A1  Oct. 27, 2005

(30) Foreign Application Priority Data

Apr. 26, 2004 (TW) ............................... 93111543 A

(51) Int. Cl.
*H04N 1/04* (2006.01)
(52) U.S. Cl. .................... 358/497; 358/483; 358/474; 358/475
(58) Field of Classification Search ............... 358/497, 358/494, 474, 475, 505, 509, 483, 482; 399/362, 399/379, 380; 355/25, 75
See application file for complete search history.

(56) References Cited

U.S. PATENT DOCUMENTS

| | | | |
|---|---|---|---|
| 5,712,718 A | 1/1998 | Chen | |
| 6,459,510 B1 * | 10/2002 | Brewer et al. | 358/497 |
| 7,408,684 B2 * | 8/2008 | Wang | 358/475 |

FOREIGN PATENT DOCUMENTS

| | | | |
|---|---|---|---|
| CN | 2487036 Y | | 4/2002 |
| JP | 2000165608 A | * | 6/2000 |
| TW | 275415 | | 6/1984 |

* cited by examiner

*Primary Examiner*—Cheukfan Lee

(57) ABSTRACT

A book scanner with a minimized scan margin scans an open book, which has a first inner surface, a second inner surface and a binding section. The book scanner includes a book supporting structure and a scanning module. The book supporting structure is composed of a transparent first portion and a second portion, which define a first angle smaller than 180 degrees and a ridge. The scanning module scans the first inner surface of the book contacting the first portion. The scanning module can scan a scan region of the first inner surface and a distance from the scan region to the ridge is substantially shorter than 4 millimeters.

13 Claims, 5 Drawing Sheets

BOOK SCANNER WITH A MINIMIZED SCAN MARGIN

BACKGROUND OF THE INVENTION

1. Field of the Invention

The invention relates to a book scanner with a minimized scan margin, and more particularly to a book scanner with a zero scan margin.

2. Description of the Related Art

The conventional book scanners can be classified into two types according to the moving direction of the scanning module and the extending direction of the binding section of a book placed on the book scanner. The first type has a scanning module that moves in a direction parallel to the extending direction of the binding section of the book. The second type has a scanning module that moves in a direction perpendicular to the extending direction of the binding section of the book. The invention is to solve the problems of these two types of book scanners.

In order to facilitate the process of scanning an open book, which includes documents that are bound together, the book scanner usually has a sloped surface and a transparent platen to support the open book so as to obtain the better scan quality.

In order to acquire the image close to the binding section, beside that the problem of the insufficient and nonuniform illumination on the binding section has to be overcome, the structure of the book scanner has to be modified in order to minimize the scan margin and consequently obtain a binding section image of better quality.

The Taiwan Patent Publication No. 275415 discloses a book scanner including the aforementioned sloped surface and transparent platen. However, because the sloped surface and the transparent platen have to be fixed together using an opaque component, the scanner cannot scan the binding section of the book. The shortest distance from a scan region, which defines the area the prior art book scanner scans, to the ridge defined by the sloped surface and the transparent platen ranges from 4 to 6 millimeters or often greater than 6 millimeters. Therefore, a quality image close to the binding section cannot be acquired. If a book is very thick and cannot be completely spread out, the image close to the binding section cannot be acquired by the conventional book scanner, and image distortion tends to occur.

SUMMARY OF THE INVENTION

It is therefore an object of the invention to provide a book scanner with a minimized scan margin. The book image close to a ridge of the book scanner can be correctly scanned, or even the book image on the ridge of the book scanner can be correctly scanned because the book supporting structure close to the ridge is made transparent.

To achieve the above-mentioned object, the invention provides a book scanner for scanning an open book, which has a first inner surface, a second inner surface and a binding section. The book scanner includes a book supporting structure and a scanning module. The book is placed on the book supporting structure. The book supporting structure is composed of a first portion and a second portion. The first portion and the second portion define a first angle smaller than 180 degrees and a ridge, wherein the binding section of the book is disposed above the ridge. The first portion is a transparent plate. The scanning module scans the first inner surface of the book contacting the first portion. The scanning module scans a scan region of the first inner surface, and a distance from the scan region to the ridge is substantially shorter than 4 millimeters.

Thus, the book image close to or on the ridge of the book scanner can be correctly scanned, and a scan image with zero scan margin can be obtained.

DETAILED DESCRIPTION OF THE INVENTION

Figure 1:
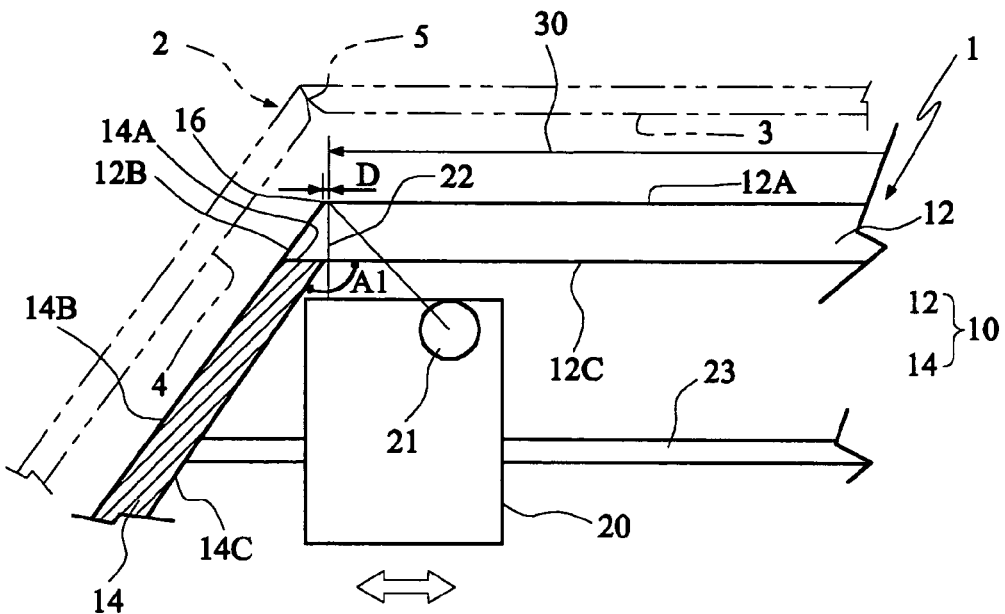
FIG. 1 is a schematic illustration showing a book scanner according to a first embodiment of the invention.

FIG. 1 is a schematic illustration showing a book scanner according to a first embodiment of the invention. As shown in FIG. 1, the book scanner 1 of the invention scans a book 2, which has a first inner surface 3, a second inner surface 4 and a binding section 5 in an open state. The book scanner 1 includes a book supporting structure 10 and a scanning module 20. The book supporting structure 10 supporting the book 2 placed thereon is composed of a first portion 12 and a second portion 14. The first portion 12 and the second portion 14 define a first angle A1 smaller than 180 degrees and a ridge 16. The binding section 5 of the book 2 is disposed above the ridge 16.

The first portion 12 includes an upper surface 12A contacting the first inner surface 3 and a first side surface 12B contacting the second inner surface 4. An angle between the first side surface 12B and the upper surface 12A equals the first angle A1. The second portion 14 is opaque and has a second side surface 14A contacting a lower surface 12C of the first portion 12. An external surface 14B of the second portion 14 and the first side surface 12B of the first portion 12 are positioned on the same plane, so as to support the second inner surface 4 of the book 2. The ridge 16 is close to the binding section 5 of the book 2, and the first portion 12 is a transparent plate corresponding to a glass window of a typical scanner.

The scanning module 20 scans the first inner surface 3 of the book 2 contacting the first portion 12. The scanning module 20 may be a CCD (Charge Coupled Device) scanning module or a CIS (Contact Image Sensor) scanning module. The scanning module 20 can scan a scan region 30 of the first inner surface 3. According to the design of the invention, the distance D from the scan region 30 to the ridge 16 is substantially shorter than 4 millimeters.

In this embodiment, the scanning module 20 moves in a direction perpendicular to the ridge 16 (i.e., slides along a guiding rod 23), as indicated by the arrow. The light source 21 of the scanning module 20, which may be a CCFL (Cold Cathode Fluorescent Lamp) light source or composed of a LED and a light-guiding rod), emits light rays on the first inner surface 3 of the book 2. For the sake of clarification, the book 2 in the drawing is positioned above the book supporting structure 10. Then, an optical path 22 from the first inner surface 3 to the scanning module 20 is substantially perpendicular to the upper surface 12A of the first portion 12.

Figure 2:
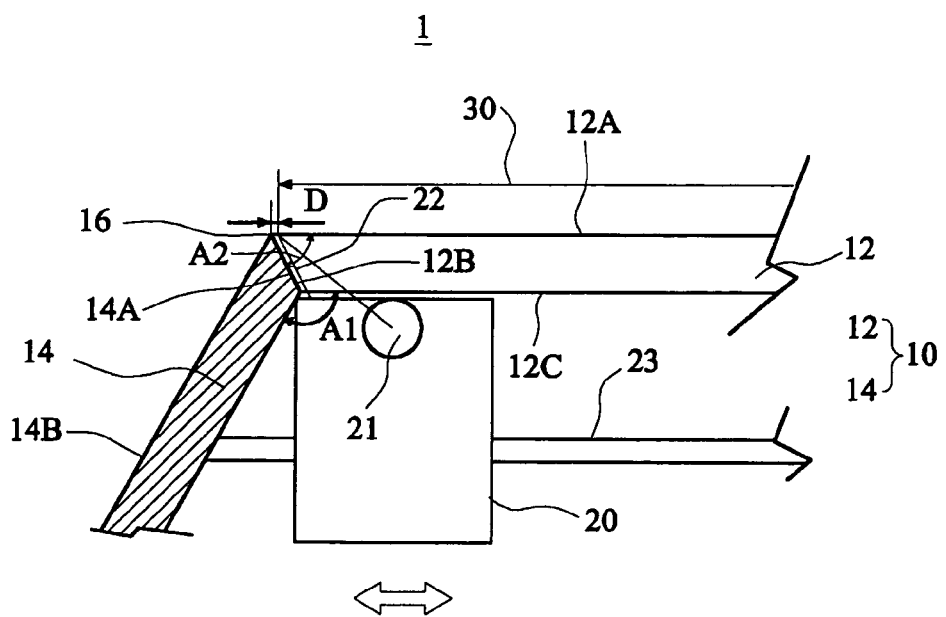
FIG. 2 is a schematic illustration showing a book scanner according to a second embodiment of the invention.

FIG. 2 is a schematic illustration showing a book scanner according to a second embodiment of the invention. As shown in FIG. 2, this embodiment is similar to the first embodiment. The first portion 12 of the book scanner 1 includes an upper surface 12A contacting the first inner surface 3, and a first side surface 12B. The first side surface 12B and the upper surface 12A define a second angle A2 smaller than 90 degrees. In addition, the second portion 14 of the book scanner 1 includes an external surface 14B contacting the second inner surface 4 and a second side surface 14A, which is adjacent to the external surface 14B and contacts the first side surface 12B. The second side surface 14A and the first side surface 12B may be adhered together by an adhesive so as to enhance the intensity of the book supporting structure 10. In this embodiment, an optical path 22 from the first inner surface 3 to the scanning module 20 is substantially parallel to the first side surface 12B of the first portion 12.

Figure 3:
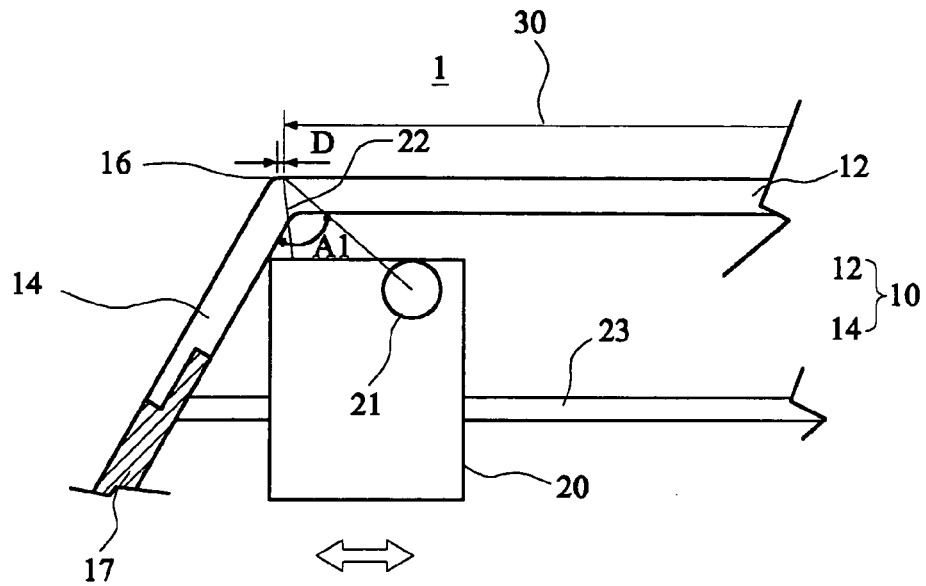
FIG. 3 is a schematic illustration showing a book scanner according to a third embodiment of the invention.

FIG. 3 is a schematic illustration showing a book scanner according to a third embodiment of the invention. As shown in FIG. 3, this embodiment is similar to the first embodiment. The second portion 14 is transparent and connected to a housing 17 of a scanner. It is to be noted that the second portion 14 of FIGS. 1 and 2 may be the housing of the scanner. Thus, the first portion 12 and the second portion 14 in this embodiment are formed by a bent transparent material.

Figure 4:
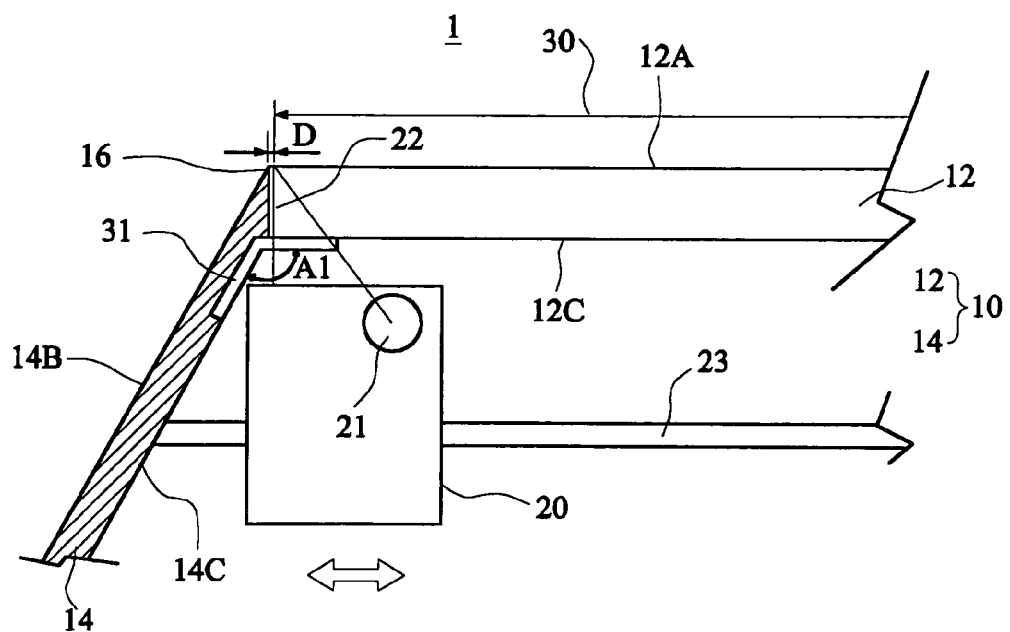
FIG. 4 is a schematic illustration showing a book scanner according to a fourth embodiment of the invention.

FIG. 4 is a schematic illustration showing a book scanner according to a fourth embodiment of the invention. As shown in FIG. 4, this embodiment is similar to the first embodiment. The second portion 14 is opaque, and the second portion 14 and the first portion 12 are joined together by a first transparent fixing part 31. The first transparent fixing part 31 is bent into the first angle A1, and is fixed to a lower surface 12C of the first portion 12 and an inner surface 14C of the second portion 14. The optical path 22 still can pass through the first portion 12 and the first transparent fixing part 31.

Figure 5:
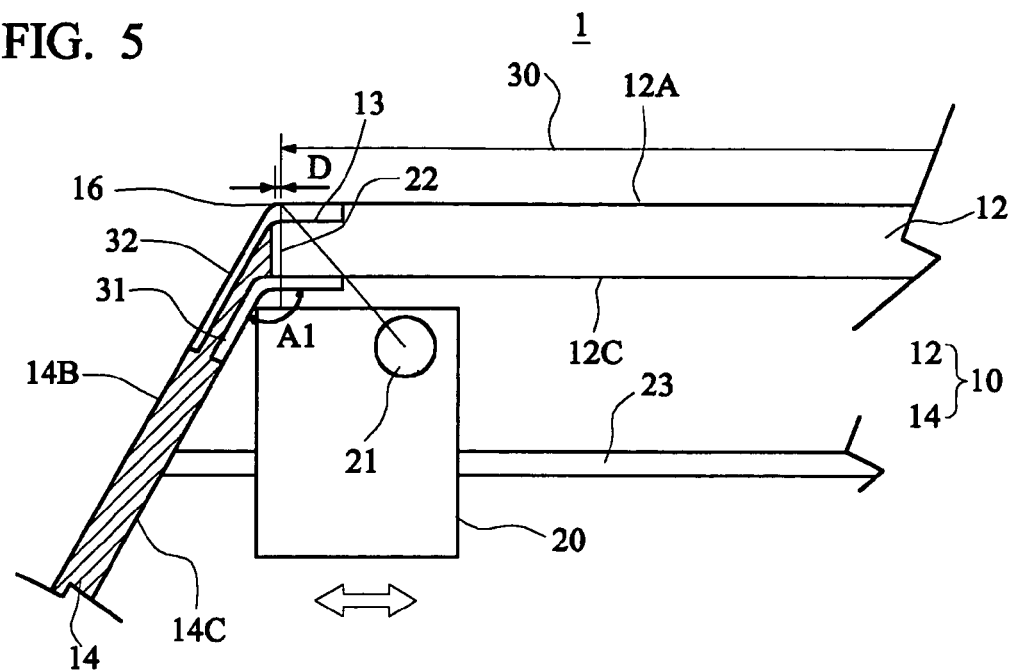
FIG. 5 is a schematic illustration showing a book scanner according to a fifth embodiment of the invention.

FIG. 5 is a schematic illustration showing a book scanner according to a fifth embodiment of the invention. As shown in FIG. 5, this embodiment is similar to the fourth embodiment. In addition, the second portion 14 and the first portion 12 are further joined together by a second transparent fixing part 32, which is bent into the first angle A1, with one end fixed to a depression 13 of the first portion 12, such that a surface of the part 32 is at the same level surface as an upper surface 12A of the first portion 12, and with the other end fixed to an external surface 14B of the second portion 14. The optical path 22 still can pass through the first portion 12, the first transparent fixing part 31 and the second transparent fixing part 32.

Figure 6:
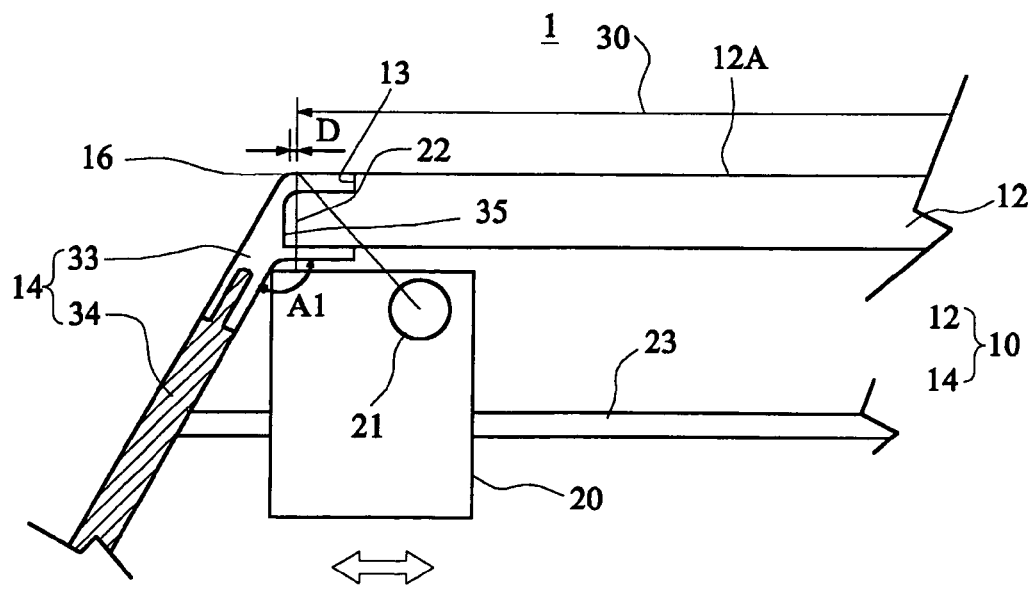
FIG. 6 is a schematic illustration showing a book scanner according to a sixth embodiment of the invention.

FIG. 6 is a schematic illustration showing a book scanner according to a sixth embodiment of the invention. Referring to FIG. 6, the second portion 14 of this embodiment includes an opaque section 34 and a transparent section 33. The transparent section 33 is connected to the opaque section 34, and the transparent section 33 is formed with a slot 35, into which the first portion 12 with a depression 13 is inserted and fixed in place. The optical path 22 still can pass through the first portion 12 and the transparent section 33 of the second portion 14.

Figure 7:
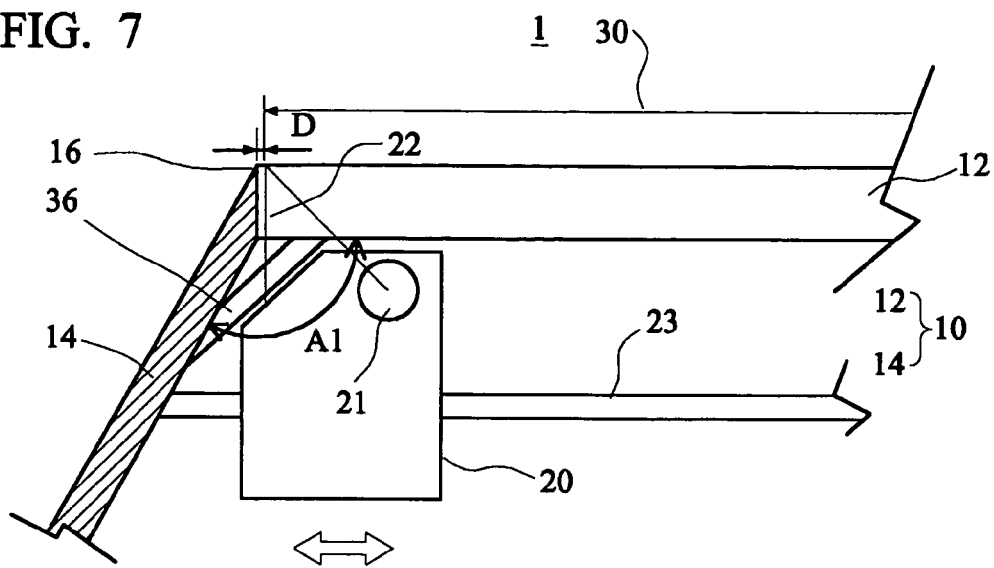
FIG. 7 is a schematic illustration showing a book scanner according to a seventh embodiment of the invention.

FIG. 7 is a schematic illustration showing a book scanner according to a seventh embodiment of the invention. As shown in FIG. 7, the second portion 14 and the first portion 12 of this embodiment are joined together by a transparent fixing plate 36. The optical path 22 still can pass through the first portion 12 and the transparent fixing plate 36.

Figure 8:
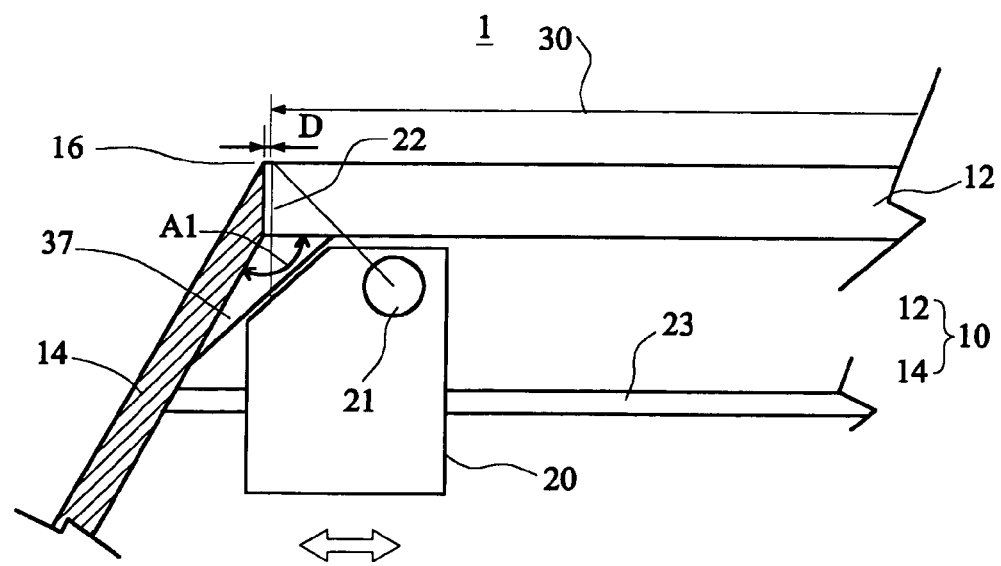
FIG. 8 is a schematic illustration showing a book scanner according to an eighth embodiment of the invention.

FIG. 8 is a schematic illustration showing a book scanner according to an eighth embodiment of the invention. As shown in FIG. 8, the second portion 14 and the first portion 12 are joined together by a transparent triangular structure 37, which has a first angle A1. The optical path 22 still can pass through the first portion 12 and the transparent triangular structure 37.

Figure 9:
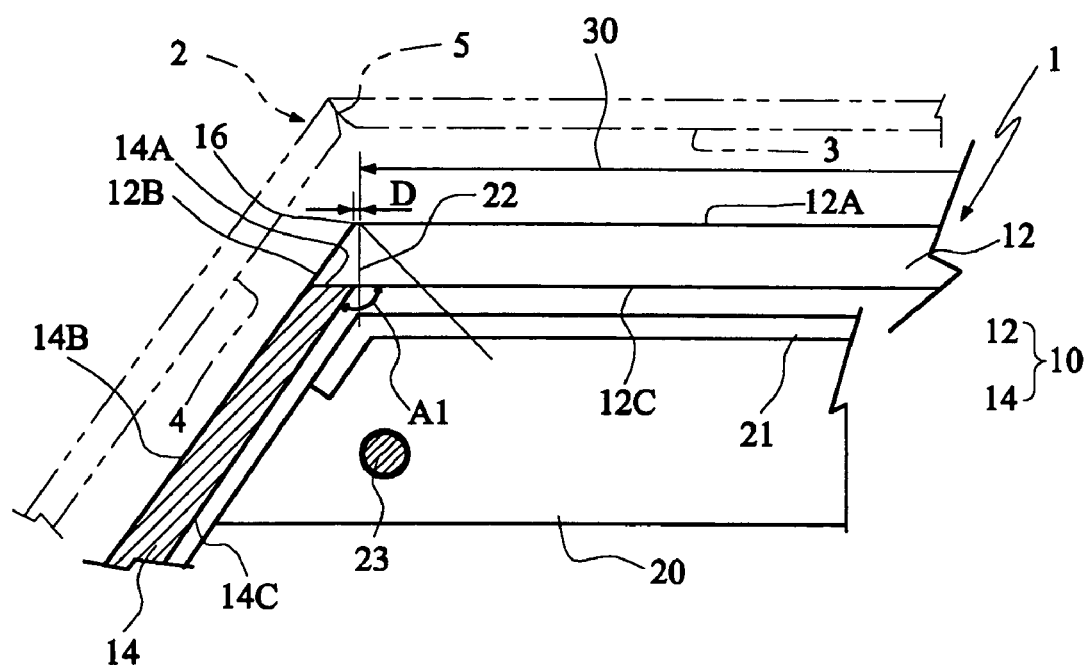
FIG. 9 is a schematic illustration showing a book scanner according to a ninth embodiment of the invention.

FIG. 9 is a schematic illustration showing a book scanner according to a ninth embodiment of the invention. As shown in FIG. 9, this embodiment is similar to the first embodiment. However, the scanning module 20 moves along a direction parallel to the ridge 16, and the scanning module 20 has a curved light source to compensate for the luminance of the light source close to the binding section of the book and to enhance the scan quality.

According to the above-mentioned structures of the invention, the book supporting structure close to the ridge of the book scanner is made transparent such that the book image close to the ridge of the book scanner, or even the book image on the ridge, can be correctly scanned. In practice, the invention can obtain a scan image with a zero scan margin. That is, the distance D from the scan region 30 of the scanning module 20 to the ridge 16 in this invention can be minimized to 0, and the problems encountered in the prior art, which can only achieve a minimum distance of 4 millimeters, can be overcome. Thus, the invention provides a solution for the user who needs to scan the image that is very close to the binding edge of the book.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A book scanner for scanning an open book, which has a first inner surface, a second inner surface and a binding section, the book scanner comprising:

a book supporting structure, on which the book is placed, wherein the book supporting structure is composed of a first portion and a second portion, the first portion and the second portion define a first angle smaller than 180 degrees and a ridge, wherein the binding section of the book is disposed above the ridge, and the first portion is a transparent plate; and a scanning module for scanning the first inner surface of the book contacting the first portion, wherein the scanning module scans a scan region of the first inner surface, and a distance from the scan region to the ridge is substantially shorter than 4 millimeters, wherein the first portion comprises:

an upper surface contacting the first inner surface; and a first side surface contacting the second inner surface, wherein the first side surface and the upper surface define the first angle.

2. The book scanner according to claim 1, wherein a second side surface of the second portion contacts a lower surface of the first portion, and an external surface of the second portion and the first side surface of the first portion are positioned on the same plane.

3. The book scanner according to claim 2, wherein an optical path from the first inner surface to the scanning module is substantially perpendicular to the upper surface of the first portion.

4. The book scanner according to claim 1, wherein the scanning module is a CCD (Charge Coupled Device) scanning module or CIS (Contact Image Sensor) scanning module.

5. The book scanner according to claim 1, wherein the scanning module moves in a direction perpendicular to the ridge.

6. The book scanner according to claim 1, wherein the scanning module moves in a direction parallel to the ridge.

7. The book scanner according to claim 1, wherein the second portion is transparent.

8. A book scanner for scanning an open book, which has a first inner surface, a second inner surface and a binding section, the book scanner comprising:
- a book supporting structure, on which the book is placed, wherein the book supporting structure is composed of a first portion and a second portion, the first portion and the second portion define a first angle smaller than 180 degrees and a ridge, wherein the binding section of the book is disposed above the ridge, and the first portion is a transparent plate; and
- a scanning module for scanning the first inner surface of the book contacting the first portion, wherein the scanning module scans a scan region of the first inner surface, and a distance from the scan region to the ridge is substantially shorter than 4 millimeters, wherein:
- the first portion comprises:
    - an upper surface contacting the first inner surface; and
    - a first side surface, which defines a second angle smaller than 90 degrees with the upper surface; and
- the second portion comprises:
    - an external surface contacting the second inner surface; and
    - a second side surface, adjacent to the external surface, contacting the first side surface.

9. The book scanner according to claim 8, wherein an optical path from the first inner surface to the scanning module is substantially parallel to the first side surface of the first portion.

10. The book scanner according to claim 8, wherein the second portion is transparent.

11. A book scanner for scanning an open book, which has a first inner surface, a second inner surface and a binding section, the book scanner comprising:
- a book supporting structure, on which the book is placed, wherein the book supporting structure is composed of a first portion and a second portion, the first portion and the second portion define a first angle smaller than 180 degrees and a ridge, wherein the binding section of the book is disposed above the ridge, and the first portion is a transparent plate; and
- a scanning module for scanning the first inner surface of the book contacting the first portion, wherein the scanning module scans a scan region of the first inner surface, and a distance from the scan region to the ridge is substantially shorter than 4 millimeters,
- wherein the second portion is opaque, the second portion and the first portion are joined together by a first transparent fixing part, which is bent to form the first angle and is fixed to a lower surface of the first portion and an inner surface of the second portion.

12. The book scanner according to claim 11, wherein the second portion and the first portion are further joined together by a second transparent fixing part, which is bent to form the first angle, with one end fixed into a depression of the first portion, such that a surface of the second transparent fixing part is at the same level surface as an upper surface of the first portion, and with the other end fixed to an external surface of the second portion.

13. A book scanner for scanning an open book, which has a first inner surface, a second inner surface and a binding section, the book scanner comprising:
- a book supporting structure, on which the book is placed, wherein the book supporting structure is composed of a first portion and a second portion, the first portion and the second portion define a first angle smaller than 180 degrees and a ridge, wherein the binding section of the book is disposed above the ridge, and the first portion is a transparent plate; and
- a scanning module for scanning the first inner surface of the book contacting the first portion, wherein the scanning module scans a scan region of the first inner surface, and a distance from the scan region to the ridge is substantially shorter than 4 millimeters,
- wherein the second portion comprises:
- an opaque section; and
- a transparent section connected to the opaque section, wherein the transparent section is formed with a slot into which the first portion having a depression is inserted and fixed.

* * * * *